United States Patent
Zhao

(10) Patent No.: US 12,556,341 B2
(45) Date of Patent: Feb. 17, 2026

(54) RETRANSMISSION FEEDBACK METHOD AND DEVICE FOR SIDELINK COMMUNICATION, AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 465 days.

(21) Appl. No.: 17/601,811

(22) PCT Filed: Apr. 9, 2019

(86) PCT No.: PCT/CN2019/081956
§ 371 (c)(1),
(2) Date: Oct. 6, 2021

(87) PCT Pub. No.: WO2020/206616
PCT Pub. Date: Oct. 15, 2020

(65) Prior Publication Data
US 2022/0182206 A1  Jun. 9, 2022

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1607* (2013.01); *H04L 5/16* (2013.01); *H04W 72/044* (2013.01)

(58) Field of Classification Search
CPC ... H04L 1/1607; H04L 1/1854; H04L 1/1861; H04L 1/189; H04L 1/1812; H04L 5/0044;
(Continued)

(56) References Cited

U.S. PATENT DOCUMENTS

2007/0258402 A1* 11/2007 Nakamata ........... H04W 72/563
370/329
2008/0225791 A1* 9/2008 Pi ......................... H04B 7/0632
370/329
(Continued)

FOREIGN PATENT DOCUMENTS

WO   WO 2016131344 A1   8/2016
WO   WO 2018060674 A1   4/2018
(Continued)

OTHER PUBLICATIONS

PCT/CN2019/081956 English translation of the International Search Report dated Jan. 16, 2020, 2 pages.
(Continued)

Primary Examiner — Stephen J Clawson
(74) Attorney, Agent, or Firm — Cozen O'Connor

(57) ABSTRACT

The present disclosure relates to a retransmission feedback method for sidelink communication, related to the technical field of communications. The method is executed by a first terminal. The method includes: generating feedback information for each retransmission during a retransmission process of sidelink data with a second terminal, the feedback information indicating whether the sidelink data is correctly received, the retransmission process comprising at least one retransmission; obtaining a feedback resource of each retransmission in the retransmission process; and transmitting the feedback information of each retransmission to the second terminal through a feedback resource of the corresponding retransmission.

11 Claims, 5 Drawing Sheets

(51) Int. Cl.
  *H04L 5/16* (2006.01)
  *H04W 72/044* (2023.01)
(58) Field of Classification Search
  CPC ...... H04L 5/0055; H04L 5/16; H04W 72/044;
        H04W 92/18; H04W 4/40; H04W 76/14;
                                    H04W 72/0457
  See application file for complete search history.

(56) References Cited

U.S. PATENT DOCUMENTS

| | | | | |
|---|---|---|---|---|
| 2008/0311942 | A1* | 12/2008 | Kim | H04L 5/0005 |
| | | | | 455/509 |
| 2013/0225184 | A1* | 8/2013 | Liu | H04L 1/1893 |
| | | | | 455/450 |
| 2014/0321293 | A1* | 10/2014 | Hwang | H04L 1/1692 |
| | | | | 370/242 |
| 2015/0148030 | A1* | 5/2015 | Seo | H04W 72/0453 |
| | | | | 455/552.1 |
| 2018/0145797 | A1* | 5/2018 | Yeo | H04L 1/1812 |
| 2019/0052436 | A1 | 2/2019 | Desai et al. | |
| 2019/0296863 | A1* | 9/2019 | Hu | H04W 72/23 |
| 2020/0120663 | A1* | 4/2020 | Parkvall | H04L 1/1893 |
| 2020/0195389 | A1* | 6/2020 | Basu Mallick | H04L 1/1887 |
| 2022/0045800 | A1* | 2/2022 | Chen | H04L 1/1867 |
| 2022/0166557 | A1* | 5/2022 | Lee | H04L 1/1812 |

FOREIGN PATENT DOCUMENTS

| | | |
|---|---|---|
| WO | WO 2018125686 A2 | 7/2018 |
| WO | WO 2018171540 A1 | 9/2018 |
| WO | WO 2018195826 A1 | 11/2018 |

OTHER PUBLICATIONS

Indian Patent Application No. 202147050274 Office Action dated Mar. 28, 2022, 7 pages.
European Patent Application No. 19924137.3 Search and Opinion dated Mar. 21, 2022, 7 pages.

* cited by examiner

RETRANSMISSION FEEDBACK METHOD AND DEVICE FOR SIDELINK COMMUNICATION, AND STORAGE MEDIUM

CROSS-REFERENCE TO RELATED APPLICATION

This application is a U.S. national phase of International Application No. PCT/CN2019/081956, filed on Apr. 9, 2019, the entire content of which is incorporated herein by reference.

TECHNICAL FIELD

The disclosure relates to the field of communication technology, and in particular to a retransmission feedback method for sidelink communication, a device and a storage medium.

BACKGROUND

Rapid emergence of next-generation Internet applications drives the evolution of wireless communication technology, which in the meantime, imposes higher requirements for wireless communication technology.

In a communication scenario of vehicle to everything (V2x) communication, a single device can realize data transmission with other devices through the half-duplex technology, and there is a need for feedback retransmission during the data transmission process. In the related art, there is no good solution for the feedback retransmission mechanism between devices in the half-duplex state.

SUMMARY

Embodiments of the disclosure provide a retransmission feedback method for sidelink communication, a retransmission feedback apparatus for sidelink communication and a storage medium. The technical solution is provided as follows.

According to certain embodiments of the disclosure, there is provided a retransmission feedback method for sidelink communication, which is executed by a first terminal. The method includes: generating feedback information for each retransmission during a retransmission process of sidelink data with a second terminal, the feedback information indicating whether the sidelink data is correctly received, the retransmission process including at least one retransmission; obtaining a feedback resource of each retransmission in the retransmission process; and transmitting the feedback information of each retransmission to the second terminal through a feedback resource of the corresponding retransmission.

According to certain embodiments of the disclosure, there is provided a retransmission feedback method for sidelink communication, which is executed by a second terminal. The method includes: obtaining a feedback resource of each retransmission during a retransmission process of sidelink data with a first terminal, the retransmission process including at least one retransmission; and receiving feedback information of each retransmission sent by the first terminal through a feedback resource of a corresponding retransmission, the feedback information indicating whether the sidelink data is correctly received.

According to certain embodiments of the disclosure, there is provided a retransmission feedback apparatus for sidelink communication, applied to a first terminal. The apparatus includes: a processor and a memory for storing instructions executable by the processor. The processor is configured to: generate feedback information for each retransmission during a retransmission process of sidelink data with a second terminal, the feedback information indicating whether the sidelink data is correctly received, the retransmission process including at least one retransmission; obtain a feedback resource of each retransmission in the retransmission process; and transmit the feedback information of each retransmission to the second terminal through a feedback resource of the corresponding retransmission.

According to certain embodiments of the disclosure, there is provided a retransmission feedback apparatus for sidelink communication, applied to a second terminal. The apparatus further includes: a processor and a memory for storing instructions executable by the processor. The processor is configured to: obtain a feedback resource of each retransmission during a retransmission process of sidelink data with a first terminal, the retransmission process including at least one retransmission; and receive feedback information of each retransmission sent by the first terminal through a feedback resource of a corresponding retransmission, the feedback information indicating whether the sidelink data is correctly received.

According to certain embodiments of the disclosure, there is provided a computer-readable storage medium containing executable instructions, and a processor in a first terminal calls the executable instructions to implement the retransmission feedback method for sidelink communication according to the first aspect of the disclosure or any optional solution according to the first aspect of the disclosure.

According to certain embodiments of the disclosure, there is provided a computer-readable storage medium containing executable instructions, and a processor in a second terminal calls the executable instructions to implement the retransmission feedback method for sidelink communication according to the second aspect of the disclosure or any optional solution according to the second aspect of the disclosure.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The network architecture and service scenarios described in the embodiments of the disclosure are intended to more clearly illustrate the technical solution of the embodiments of the disclosure, and do not constitute a limitation on the technical solution provided in the embodiments of the disclosure. Those skilled in the art may know that, with the evolution of network architecture and the emergence of new service scenarios, the technical solution provided in the embodiments of the disclosure is also applicable to similar technical problems.

To facilitate understanding, some terms and application scenarios that will be involved in the embodiments of the disclosure are briefly introduced.

Half-duplex refers to the fact that wireless communication devices cannot receive and send data on the same frequency band at the same time due to transceiver interference. That is, a wireless communication device may have multiple services at the same time. Some services require the wireless communication device to send service data, and some services require the wireless communication device to receive service data. If the wireless communication device send data on a certain time domain symbol, the wireless communication device cannot receive data sent by other wireless communication devices on the same time domain symbol, even if frequency domain resource occupied by the received data is orthogonal to frequency domain resource occupied by the data sent by the wireless communication device.

Blind re-transmission refers to that, in the data transmission process, when a wireless communication device that acts as a sending end fails to receive feedback information fed back by a wireless communication device that acts as a receiving end, the wireless communication device that acts as a transmitter directly transmits data transport blocks of the physical layer repeatedly.

Figure 1:
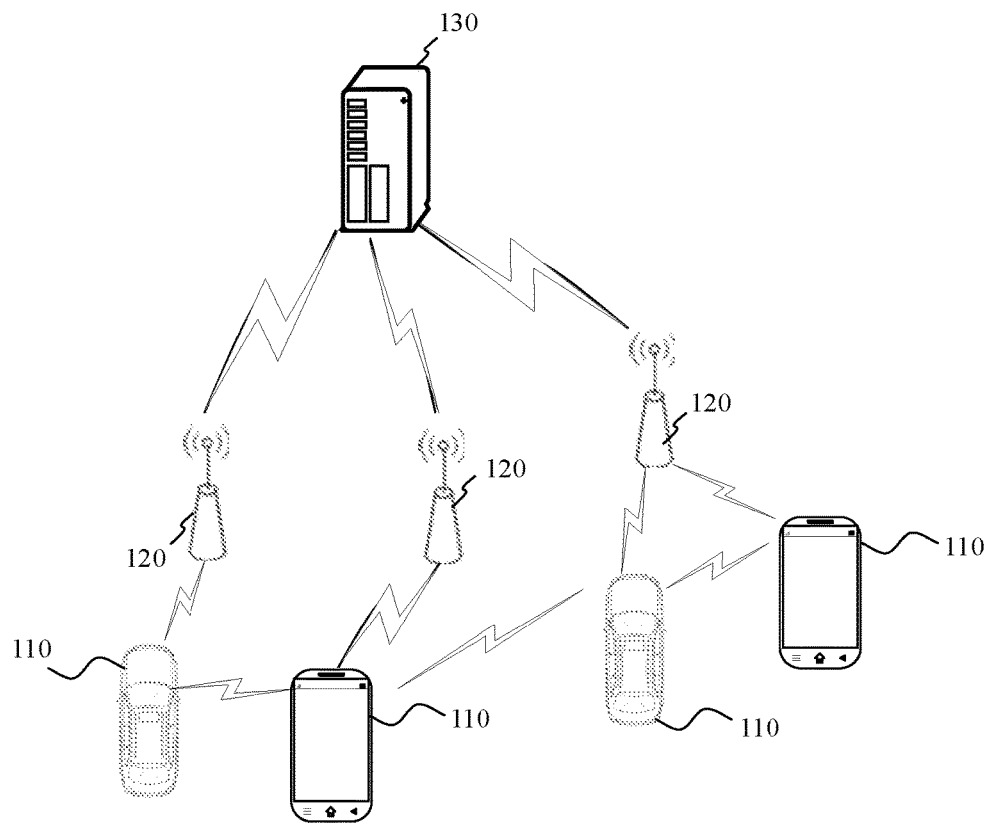
FIG. 1 is a schematic diagram of an implementation environment involved in a retransmission feedback method for sidelink communication according to some exemplary embodiments.

FIG. 1 is a schematic diagram of an implementation environment involved in a retransmission feedback method for sidelink communication according to some exemplary embodiments. As illustrated in FIG. 1, the implementation environment may include multiple terminals 110 and multiple base stations 120.

The terminal 110 may be a wireless communication device that can use wireless access technology to transmit data. For example, the terminal 110 may support cellular mobile communication technology, such as the 4th generation mobile communication (4G) technology and the 5th generation mobile communication (5G) technology. Alternatively, the terminal 110 may also support a next-generation mobile communication technology of the 5G technology.

For example, the terminal 110 may be a vehicle-mounted device, which may be a trip computer having a wireless communication function, or a wireless communication device connected to an external trip computer.

Alternatively, the terminal 110 may also be a roadside device, such as street lamps, signal lamps or other roadside devices that have the wireless communication function.

Alternatively, the terminal 110 may also be a user terminal device, such as a mobile phone (also called a "cellular" phone) and a computer with a mobile terminal. For example, the terminal 110 may be a portable, pocket-sized, handheld, built-in-computer or vehicle-mounted mobile device, such as a station (STA), a subscriber unit, a subscriber station, a mobile station, a mobile, a remote station, an access point, a remote terminal, an access terminal, a user terminal, a user agent, a user device, or user equipment (UE). For example, the terminal 110 may be a mobile terminal such as a smart phone, a tablet computer, or an e-book reader, or may be a smart wearable device such as smart glasses, a smart watch, or a smart bracelet.

Optionally, the terminal 110 is a wireless communication device supporting half-duplex technology.

Optionally, wireless communication through the sidelink communication is supported between the terminals 110.

The base station 120 may be a network side device in a wireless communication system. The wireless communication system may be a 4G system, also known as a long-term evolution (LTE) system. Alternatively, the wireless communication system may also be a 5G system, also known as a new radio system. Alternatively, the wireless communication system may also be the next-generation system of the 5G system.

The base station 120 may be an Evolved Node Base (eNB) adopted in the 4G system. Alternatively, the base station 120 may also be a base station adopting a centralized distributed architecture (gNB) in the 5G system. When the base station 120 adopts the centralized distributed architecture, the base station 120 generally includes a central unit (CU) and at least two distributed units (DU). The CU is provided with a Packet Data Convergence Protocol (PDCP) layer, a Radio Link Control (RLC) layer, and a protocol stack of a Media Access Control (MAC) layer. The DU is provided with a physical (PHY)-layer protocol stack, and the embodiments of the disclosure do not limit the specific implementation manner of the base station 120.

A wireless connection may be established between the base station 120 and the terminal 110 through a wireless air interface. In different embodiments, the wireless air interface may be a wireless air interface based on the 4G standard. Optionally, the wireless air interface may be a wireless air interface based on the 5G standard. For example, the wireless air interface is a new air interface.

Optionally, the wireless air interface may also be a wireless air interface based on a next-generation mobile communication network technology standard based on the 5G standard.

Optionally, the wireless communication system may further include a network management device 130.

The multiple base stations 120 are connected to the network management device 130 respectively. The network management device 130 may be a core network device in the wireless communication system. For example, the network management device 130 may be a Mobility Management Entity (MME) in an Evolved Packet Core (EPC). Alternatively, the network management device may also be other core network devices, such as a Serving Gateway (SGW), a Public Data Network Gateway (PGW), and a Policy and Charging Rules Function (PCRF) unit or a Home Subscriber Server (HSS). The implementation form of the network management device 130 is not limited in the embodiments of the disclosure.

In the wireless communication scenario shown in FIG. 1, simultaneous communication between multiple terminals is very common. For example, in vehicle to everything (V2x), vehicle-to-vehicle (V2V) communication, vehicle-to-infrastructure (V2I) communication, and vehicle-to-pedestrian (V2P) communication are supported. In order to improve the communication efficiency of V2x, cellular network support for V2x communication in Internet of vehicle (IoV), namely (cellular based V2x) C-V2x, is provided in the related art. In C-V2x, the communication between the vehicle-mounted device and other devices can be transferred through the base station and the core network, that is, the communication link between the terminal and the base station in the original cellular network is used for communication (uplink or downlink communication). A direct link between devices may also be used for communication (sidelink communication). Compared with Uu interface communication, the sidelink communication has the characteristics of short delay and low overhead, and is very suitable for direct communication between the vehicle-mounted device and other peripheral devices close to the vehicle-mounted device in geographical location.

In the related art, the sidelink communication of V2x in the LTE can only support some basic security V2x applications, such as exchanging Basic Safety Message (BSM) such as Cooperative Awareness Messages (CAM) or Decentralized Environmental Notification Message (DENM) for voice broadcast communication. With the development of technologies such as autonomous driving, in order to support new V2x services, new requirements are raised for the performance of the V2x technology. The use of the 5G NR system to support new V2x communication services and scenarios has been planned by 3rd Generation Partnership Project (3GPP) as an important content of Rel16. The 3GPP Service Requirement (SA1) working group has established some new service requirements that need to be met by V2x communication, including vehicles platooning, extended sensors, advanced driving, and remote driving. Generally, high requirements are raised for sidelink communication in the V2x of the 5G NR system.

Currently, in the discussion of sidelink communication in the V2x of the 5G NR system, random access network work group 1 (RAN WG1, RAN1 for short) resolution supports using a feedback retransmission mechanism of physical layer Hybrid Automatic Repeat Request (HARD) for unicast services and multicast services of sidelink communication in the wireless communication scenarios. Meanwhile, in order to solve the problem of a wireless communication device supporting half-duplex, blind retransmission technology is also used. In this way, even one transmission in the retransmission process is not correctly received by a wireless communication device acting as a receiving end due to the half-duplex, that is, the wireless communication device acting as a receiving end is sending data on the same time domain resource, the wireless communication device acting as a receiving end can also correctly obtain the data by receiving repeated transmissions on other time domain resources, thereby ensuring the reliability of data transmission. Moreover, for the above physical layer HARQ feedback of the sidelink communication, RAN1 resolution supports that a time interval for data transmission corresponding to a transmission distance of feedback information is set through a pre-configured method or a configured method. That is, after a wireless communication device at a sending end performs the blind retransmission process, the wireless communication device at the receiving end feeds back the transport block of current blind retransmission process, and the wireless communication device at the sending end determines whether to perform further HARQ retransmission according to feedback of the wireless communication device at the receiving end.

Figure 2:
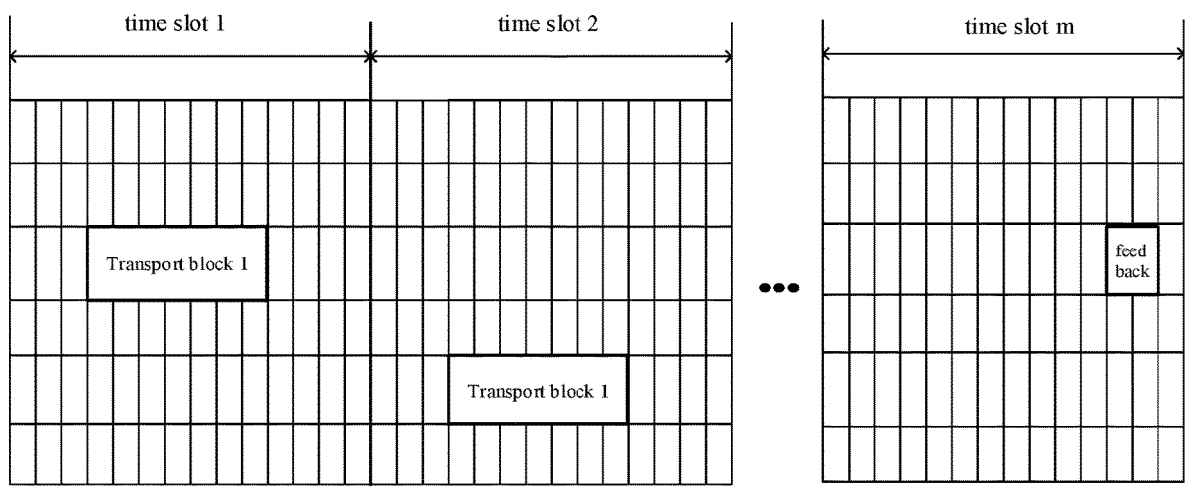
FIG. 2 is a schematic diagram of distribution of time slots and transport blocks transmitted in a blind retransmission process according to an embodiment of the disclosure.

FIG. 2 illustrates a schematic diagram of distribution of time slots and transport blocks transmitted in a blind retransmission process according to an embodiment of the disclosure. As illustrated in FIG. 2, the number of blind retransmissions performed by the wireless communication device at the sending end is two, distributed in time slot 1 and time slot 2 respectively. After a time slot (time slot 2) of the last transmission, the wireless communication device at the receiving end performs HARQ feedback for a blind retransmission process in a time slot m. A time interval between the time slot m and the time slot 2 is the above time interval for data transmission corresponding to the transmission distance of feedback information set through the pre-configured method or the configured method. Optionally, in the embodiments of the disclosure, the time interval for data transmission corresponding to the transmission distance of feedback information set according to the pre-configured method or the configured method is referred to as a pre-configured value.

Figure 3:
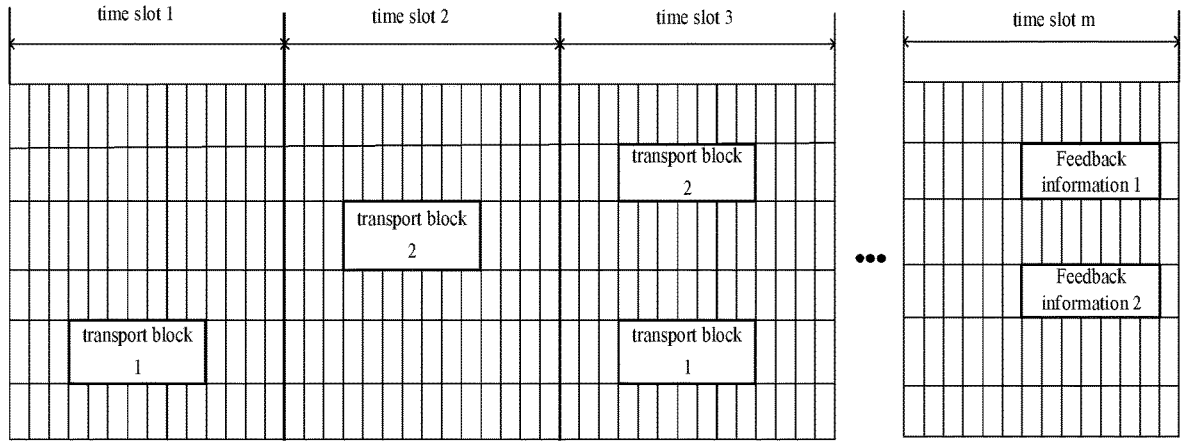
FIG. 3 is a schematic diagram of a time slot structure including transport blocks according to an embodiment of the disclosure.

In the wireless communication scenarios, a wireless communication device may often need to send data through the blind retransmission. For example, when the wireless communication device at the receiving end also has data that needs to be sent through the blind retransmission in the time slot 2 shown in FIG. 2, and when the time domain resources occupied by data sent in the current blind retransmission are overlapped with time domain resources occupied by the transport block shown in FIG. 2, and when it is at the last transmission in the blind retransmission process, data can be received or sent in time slot 2 because the wireless communication device at the receiving end works in half-duplex. FIG. 3 illustrates a schematic diagram of a time slot structure including transport blocks according to an embodiment of the disclosure. As illustrated in FIG. 3 time slot 1, time slot 2, time slot 3 and time slot m are included. The transport block 1 contained in time slot 1 and time slot 3 is a transport block sent from the wireless communication device at the sending end to the wireless communication device at the receiving end, the transport block 2 contained in time slot 2 and time slot 3 is a transmission block that the wireless communication device at the receiving end needs to send to other wireless communication devices, and the time slot m is a time slot after an interval of the pre-configured value. The wireless communication device at the receiving end, used as a receiving end of the transport block 1, needs to send feedback information 1 to the wireless communication device at the sending end in time slot m. The wireless communication device at the receiving end, used as a sending end of the transport block 2, needs to receive feedback information 2 from other wireless communication devices in time slot m. At this time, since the wireless communication device at the receiving end works in half-duplex, correspondingly, either the feedback information 1 is sent or the feedback information 2 is received in the time slot m. No matter the wireless communication device at the receiving end selects which feedback information, the other feedback information of the blind retransmission process is missed, leading to errors in the transmission process.

In order to solve the above problems existing in the blind retransmission process of the wireless communication device, the technical solution of the disclosure will be introduced and explained in some embodiments.

Figure 4:
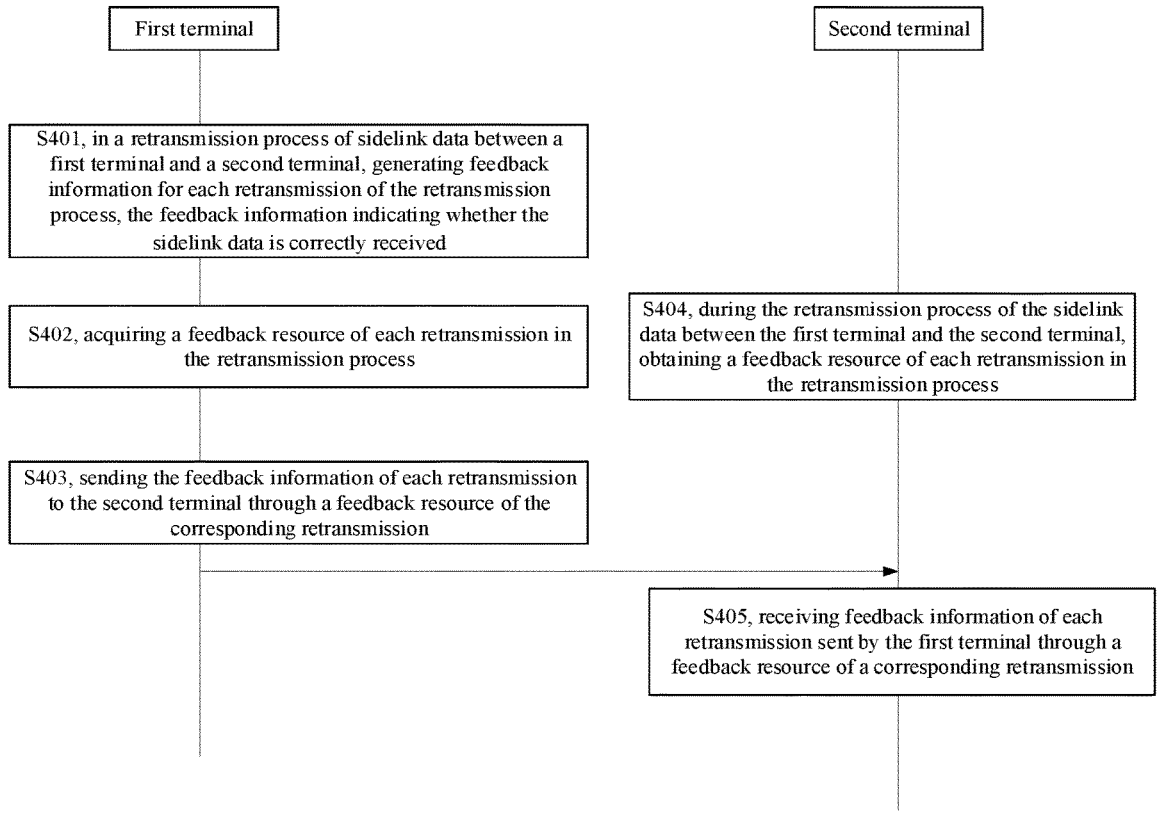
FIG. 4 is a flowchart of a retransmission feedback method for sidelink communication according to an embodiment of the disclosure.

FIG. 4 illustrates a flowchart of a retransmission feedback method for sidelink communication according to an embodiment of the disclosure. The method can be applied to the wireless communication scenario shown in FIG. 1, and may be executed by the wireless communication device in the scenario shown in FIG. 1. As illustrated in FIG. 4, the method may include the following steps.

In step 401, in a retransmission process of sidelink data with a second terminal, a first terminal generates feedback information for each retransmission of the retransmission process.

The feedback information is used to indicate whether the sidelink data is correctly received, the retransmission process includes at least one retransmission.

Optionally, the feedback information is feedback information based on the HARQ mechanism.

In step 402, the first terminal obtains a feedback resource of each retransmission during the retransmission process.

In step 403, the first terminal sends the feedback information of each retransmission to the second terminal through a feedback resource of the corresponding retransmission.

Optionally, generating the feedback information for each retransmission during the retransmission process of the sidelink data with the second terminal includes the following. Feedback information corresponding to an $i^{th}$ retransmission is generated after the $i^{th}$ retransmission in the retransmission process is performed, i being an integer greater than or equal to 1.

Optionally, when sending the feedback information for each retransmission to the second terminal on the feedback resource of the corresponding retransmission, for the $i^{th}$ retransmission in the respective retransmissions, the first terminal transmits the feedback information of the $i^{th}$ retransmission to the second terminal through the feedback resource of the $i^{th}$ retransmission.

Optionally, generating the feedback information corresponding to the $i^{th}$ retransmission after performing the $i^{th}$ retransmission in the retransmission process includes the following. The feedback information corresponding to the $i^{th}$ retransmission is generated based on a first transmission result at an end time point of the $i^{th}$ retransmission after the $i^{th}$ retransmission is performed. The first transmission result is used to indicate whether the sidelink data is correctly received during the $i^{th}$ retransmission.

Optionally, generating the feedback information corresponding to the $i^{th}$ retransmission after performing the $i^{th}$ retransmission in the retransmission process includes the following. The feedback information corresponding to the $i^{th}$ retransmission is generated based on a second transmission result at an end time point of the $i^{th}$ retransmission after the $i^{th}$ retransmission is performed. The second transmission result is used to indicate whether the sidelink data is correctly received during previous i retransmissions in the retransmission process.

Optionally, obtaining the feedback resource of each retransmission in the retransmission process includes the following. Time-frequency information of a transmission resource used by a $j^{th}$ retransmission in the retransmission process is obtained, j being an integer greater than or equal to 1. A feedback resource of the $j^{th}$ retransmission is obtained based on the time-frequency information of the transmission resource used by the $j^{th}$ retransmission and a feedback time interval.

Optionally, the feedback time interval is a time interval preset in the first terminal; or, the feedback time interval is a time interval carried in a configuration instruction sent to the first terminal by a configuration device.

Optionally, the retransmission process is a retransmission process performed by the first terminal in a half-duplex operating state.

Optionally, the retransmission process is a partial of at least two retransmissions performed between the second terminal and the first terminal for the sidelink data.

Optionally, the retransmission process is a blind retransmission process.

In step 404, during the retransmission process of the sidelink data with the first terminal, the second terminal obtains the feedback resource of each retransmission in the retransmission process.

In step 405, the second terminal receives the feedback information of each retransmission sent by the first terminal on the feedback resource of a corresponding retransmission.

Optionally, obtaining the feedback resource of each retransmission during the retransmission process of the sidelink data with the first terminal includes the following. Time-frequency information of a transmission resource used by a $j^{th}$ retransmission in the retransmission process is obtained, j being an integer greater than or equal to 1. A feedback resource of the $j^{th}$ retransmission is obtained based on the time-frequency information of the transmission resource used by the $j^{th}$ retransmission and a feedback time interval.

Optionally, the feedback time interval is a time interval preset in the second terminal; or, the feedback time interval is a time interval carried in a configuration instruction sent by a configuration device to the second terminal.

Optionally, the method further includes: canceling unfinished retransmission of the sidelink data when feedback information of the $k^{th}$ retransmission in the retransmission process is received and the feedback information of the $k^{th}$ retransmission indicates that the sidelink data is correctly received.

Optionally, the retransmission process is a retransmission process performed by the second terminal in a half-duplex operating state.

Optionally, the retransmission is a partial of at least two retransmissions performed between the second terminal and the first terminal for the sidelink data.

Optionally, the retransmission process is a blind retransmission process.

In conclusion, with the solution of the disclosure, when the sidelink communication between the terminals is performed, the first terminal feedbacks for the sidelink data in each retransmission performed by the second terminal, which prevents the problem of conflicts between the feedback information and other information when the terminal in the half-duplex state performs data transmission with multiple other devices, and improves the success rate of feedback of data retransmitted between the terminals.

The technical solution according to the embodiments of the disclosure may at least include the following beneficial effects.

The feedback information for each retransmission is generated during the retransmission process of the sidelink data between the first terminal and the second terminal, the feedback information indicates whether the sidelink data is correctly received, the retransmission process includes at least one retransmission. The feedback resource of each retransmission in the retransmission process is obtained. The feedback information of each retransmission is transmitted to the second terminal through a feedback resource of the corresponding retransmission. In the solution of the disclosure, when sidelink communication is performed between terminals, the first terminal feedbacks for the sidelink data retransmitted by the second terminal every time, which prevents the terminal from transmitting data with multiple other devices in the half-duplex state, thus the problem that the feedback information conflicts with remaining information is solved, and feedback success rate of the retransmitted data between the terminals is improved.

Figure 5:
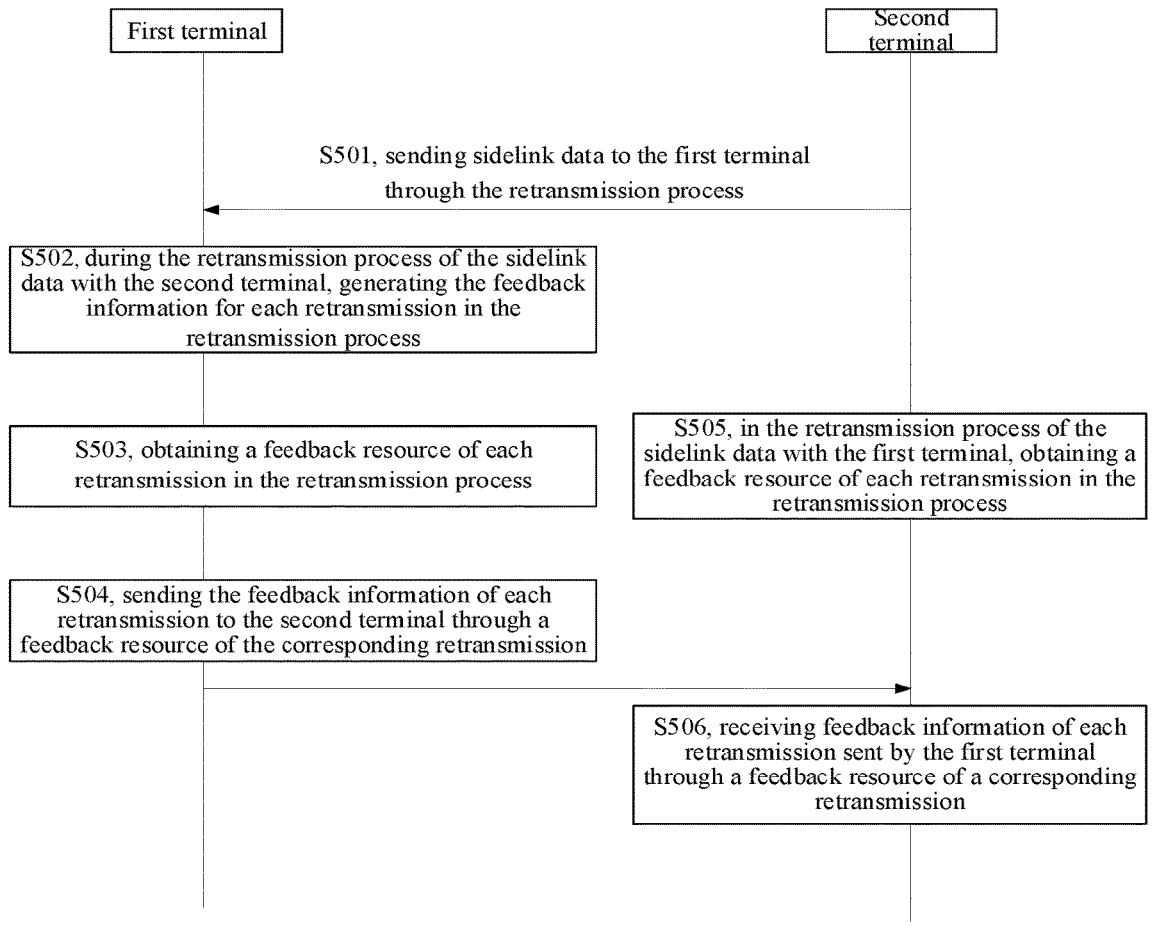
FIG. 5 is a flowchart of a retransmission feedback method for sidelink communication according to an embodiment of the disclosure.

In a possible implementation, when the first terminal and the second terminal shown in FIG. 4 are applied to the wireless communication scenario shown in FIG. 1, FIG. 5 illustrates a flowchart of a retransmission feedback method for sidelink communication according to an embodiment of the disclosure. The method can be executed by the wireless communication device in the scenario shown in FIG. 1. As illustrated in FIG. 5, the method may include the following steps.

In step 501, the second terminal sends sidelink data to the first terminal through retransmission.

Correspondingly, the first terminal receives the sidelink data sent by the second terminal through retransmission.

The retransmission process includes at least one retransmission.

The first terminal and the second terminal may be two terminals that perform sidelink communication. The second terminal is a wireless communication device that sends sidelink data in the wireless communication scenario, that is, the wireless communication device acting as the sending end. The first terminal is a wireless communication device that receives the sidelink data sent by the second terminal, that is, the wireless communication device acting as the receiving end.

Optionally, the second terminal may be a terminal in the wireless communication environment shown in FIG. 1. Further, the second terminal may be the vehicle-mounted device, the roadside device, the user terminal device shown in FIG. 1. The second terminal may use HARQ retransmission technology of the physical layer to transmit data to other wireless communication devices in the wireless communication environment. The first terminal may also be a terminal in the wireless communication environment shown in FIG. 1, and may receive data retransmitted by the second terminal.

Optionally, the retransmission technology adopted by the second terminal may also be an Automatic Repeat Request (ARQ) of a Radio Link Control (RLC) layer.

The retransmission process may be a blind retransmission process. The second terminal can directly perform multiple retransmissions on one data block according to a blind retransmission mechanism in combination with a preset retransmission strategy. For example, according to a predetermined number of retransmissions, the same data block may be repeatedly transmitted for multiple times on multiple continuous or discontinuous time-frequency resources. The first terminal can also receive the transport block retransmitted by the second terminal according to the blind retransmission mechanism.

Optionally, the process of the second terminal sending retransmission to the first terminal through retransmission may be a retransmission process performed by the second terminal in a half-duplex working state. The first terminal may also receive the sidelink data sent by the second terminal in a half-duplex working state.

Optionally, in the solution of the embodiments of the disclosure, the first terminal or the second terminal may also receive or send data through a full-duplex mechanism.

In step 502, during the retransmission process of the sidelink data with the second terminal, the first terminal generates the feedback information for each retransmission in the retransmission process.

The feedback information is used to indicate whether the sidelink data is received correctly.

When the first terminal receives the sidelink data sent by the second terminal, the first terminal may generate the feedback information for the sidelink data transmitted this time, so as to further inform the second terminal whether the first terminal successfully and correctly receives the sidelink data.

Optionally, corresponding to the physical layer HARQ retransmission mechanism, the feedback information may be a Negative Acknowledgement (NACK) or an Acknowledgement (ACK). That is, when the first terminal successfully receives the sidelink data sent by the second terminal and correctly recovers the sidelink data sent by the second terminal, the first terminal can generate an ACK for the sidelink data transmitted this time. When the first terminal fails to receive the sidelink data sent by the second terminal, or does not correctly restore the sidelink data sent by the second terminal, the first terminal may generate an NACK for the sidelink data transmitted this time.

Optionally, in the wireless communication scenario, for unicast communication, the first terminal may feed the ACK back to the second terminal when the sidelink data is correctly restored. When the first terminal fails to correctly restore the sidelink data, the first terminal may feed the NACK back to the second terminal. Optionally, for multicast communication, the first terminal may feed the ACK back to the second terminal when receiving the sidelink data correctly. When the first terminal receives the sidelink data incorrectly, the first terminal may feed the NACK back to the second terminal. Or, for the multicast communication, the first terminal may feed the NACK back to the second terminal when the first terminal receives the sidelink data incorrectly, and when the first terminal receives the sidelink data correctly, the first terminal may give no feedback to the second terminal.

Optionally, the first terminal may generate feedback information corresponding to an $i^{th}$ retransmission after performing the $i^{th}$ retransmission in the retransmission process, i being an integer greater than or equal to 1.

That is, when the second terminal sends the sidelink data to the first terminal for multiple times through retransmission, the first terminal can generate feedback information corresponding to any retransmission in the retransmission process. For example, the second terminal sends sidelink data 1 to the first terminal through 4 retransmissions, the first terminal can generate feedback information corresponding to the first retransmission in the 4 retransmissions, or generate feedback information corresponding to the second retransmission in the 4 retransmissions, and so on.

In a possible implementation, after the first terminal performs the $i^{th}$ retransmission, the first terminal may generate feedback information corresponding to the $i^{th}$ retransmission according to a first transmission result at the end of the $i^{th}$ retransmission. The first transmission result is used to indicate whether the sidelink data is correctly received during the $i^{th}$ retransmission.

Optionally, the first terminal may obtain the first transmission result of the $i^{th}$ retransmission, and generate the feedback information corresponding to the $i^{th}$ retransmission according to the first transmission result. That is, when the first transmission result indicates that the first terminal correctly receives the sidelink data during the $i^{th}$ retransmission, the first terminal may generate feedback information corresponding to the first transmission result. Optionally, the feedback information can be the ACK mentioned above. When the first transmission result indicates that the first terminal fails to correctly receive the sidelink data during the $i^{th}$ retransmission, the first terminal may also generate the feedback information corresponding to the first transmission result. Optionally, the feedback information may be the NACK mentioned above.

In a possible implementation, the feedback information corresponding to the $i^{th}$ retransmission is generated by the first terminal based on a second transmission result at an end time point of the $i^{th}$ retransmission after the $i^{th}$ retransmission is performed. The second transmission result indicates whether the sidelink data is correctly received during previous i retransmissions in the retransmission process.

Optionally, the first terminal may obtain the second transmission result of the previous i retransmissions, and generate the feedback information corresponding to the $i^{th}$ retransmission according to the second transmission result. That is, when the second transmission result indicates that the first terminal correctly receives the sidelink data during the previous i retransmissions, the first terminal may generate the feedback information corresponding to the second transmission result. Optionally, the feedback information can be the ACK. When the second transmission result indicates that the first terminal fails to correctly receive the sidelink data during the previous i retransmissions, the first terminal may also generate the feedback information corresponding to the second transmission result. Optionally, the feedback information may be the NACK.

That is, when the first terminal correctly receives the sidelink data during a certain retransmission, the first terminal may use the feedback information generated for current retransmission to perform feedback, when feeding back the feedback information of each subsequent retransmission to the second terminal.

Figure 6:
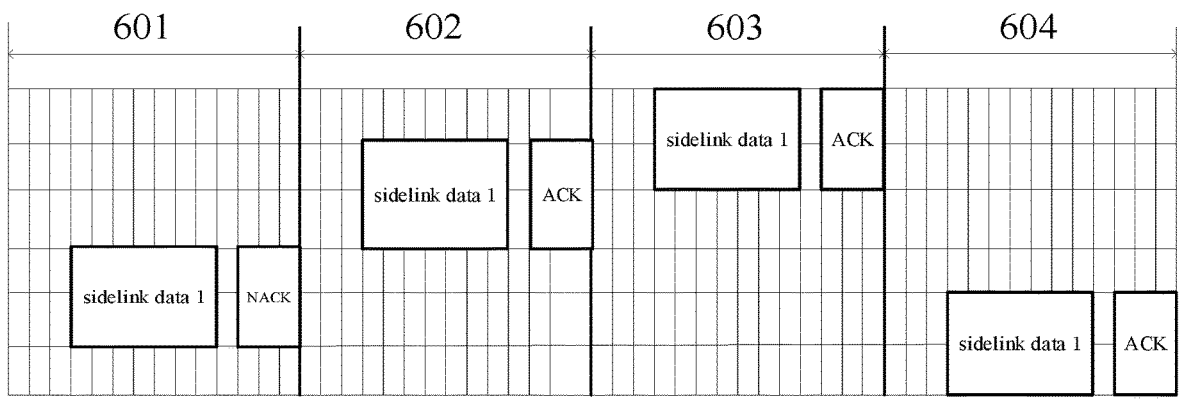
FIG. 6 is a schematic diagram of time slots of a retransmission process according to an embodiment of the disclosure.

FIG. 6 illustrates a schematic diagram of time slots of a retransmission process according to an embodiment of the disclosure. As illustrated in FIG. 6, FIG. 6 contains a first time slot 601, a second time slot 602, a third time slot 603, and a fourth time slot 604. The second terminal transmits the sidelink data 1 to the first terminal through 4 retransmissions. The time slots where the 4 retransmissions locate are shown in FIG. 6. The first terminal fails to receive the sidelink data 1 in the first retransmission performed by the second terminal and feeds back NACK to the second terminal. The first terminal successfully receives the sidelink data 1 in the second retransmission and feeds back ACK to the second terminal. In the third retransmission, when the feedback information corresponding to the third retransmission is generated, the first terminal can determine that the sidelink data 1 is correctly received before the third retransmission according to the second transmission result. Therefore, the first terminal may select the ACK generated in the second retransmission as the feedback information for the third retransmission, and feeds back to the second terminal. Optionally, the third retransmission can be referred to in the fourth retransmission. Thereby, even if the sidelink data 1 of the fourth retransmission is failed to be received in the fourth retransmission, the first terminal can feed back to the second terminal according to the feedback information corresponding to correct reception.

Optionally, the retransmission process performed between the second terminal and the first terminal may be a partial of at least two retransmissions performed between the second terminal and the first terminal for the sidelink data.

In the solution of the embodiments of the disclosure, in the retransmission performed between the first terminal and the second terminal according to the blind retransmission mechanism, for at least two retransmissions of the same sidelink data, the first terminal may give feedback for a partial of the retransmissions, and may give no feedback for the remaining retransmissions.

For example, the number of the above retransmissions is 4, and the first terminal may give feedback for a partial of the 4 retransmissions. Accordingly, the second terminal may monitor feedback information on some retransmissions in the 4 retransmissions correspondingly. For example, the first terminal can give feedback for reception results of the second retransmission and the fourth retransmission in the 4 retransmissions. Correspondingly, the second terminal monitors the transmission results of the second retransmission and the fourth retransmission in the 4 retransmissions.

The first terminal and the second terminal may determine which transmission processes in the at least two retransmissions of the same sidelink data are the above retransmission process according to a pre-configured manner.

Optionally, the second terminal may also inform the first terminal through indication signaling which transmissions in the at least two retransmissions of the same sidelink data are the above retransmission process.

In step 503, the first terminal obtains a feedback resource of each retransmission in the retransmission process.

Before the first terminal feeds back to the sidelink data sent through retransmission by the second terminal, in addition to generating the corresponding feedback information, the first terminal may determine the corresponding number of feedback resources, and feedback the generated feedback information to the second terminal on a corresponding feedback resource. The feedback resource may include time domain resource, or frequency domain resource, or both.

Optionally, the first terminal obtains time-frequency information of a transmission resource used by a $j^{th}$ retransmission in the retransmission process, j being an integer greater than or equal to 1. The first terminal obtains a feedback resource of the $j^{th}$ retransmission based on the time-frequency information of the transmission resource used by the $j^{th}$ retransmission and a feedback time interval.

For example, the obtained time-frequency information of the transmission resource is a time slot of the current $j^{th}$ retransmission. When the first terminal is to feed back the $j^{th}$ retransmission, the first terminal can learn the time slot location of the $j^{th}$ retransmission. The first terminal calculates a feedback time slot of the $j^{th}$ retransmission according to the feedback time interval, and feeds back the generated feedback information to the second terminal in the feedback time slot. That is, the feedback time slot is the feedback resource obtained by the first terminal.

Figure 7:
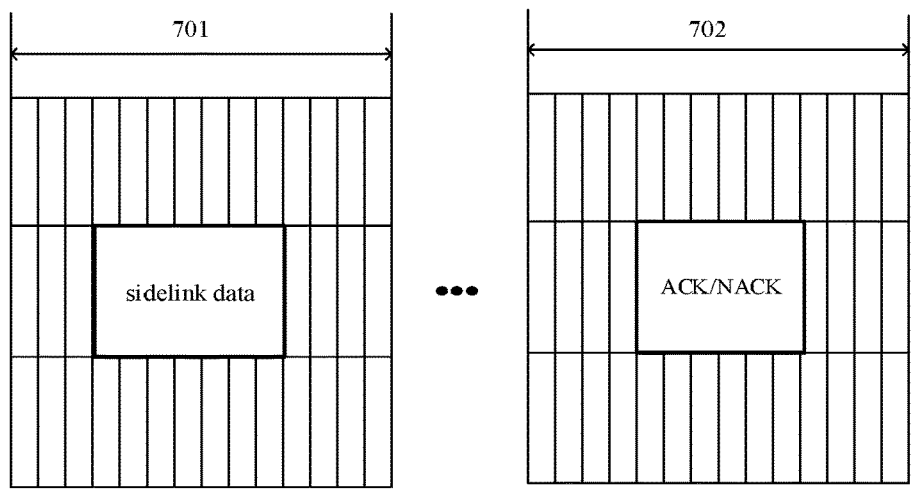
FIG. 7 is a schematic diagram of locations of feedback time slots according to an embodiment of the disclosure.

For example, FIG. 7 illustrates a schematic diagram of a location of a feedback time slot according to an embodiment of the disclosure. As illustrated in FIG. 7, the first terminal receives the sidelink data of the $j^{th}$ retransmission sent by the second terminal in the first time slot 701. The first terminal can obtain the second time slot 702 as a feedback resource corresponding to the $j^{th}$ retransmission according to the first time slot 701 and the feedback time interval. That is, the first terminal can send the generated feedback information to the second terminal in the second time slot 702.

Optionally, the $j^{th}$ retransmission may be any transmission in the above retransmission process.

The $j^{th}$ retransmission may be the $i^{th}$ retransmission, that is, j may be equal to i.

In a possible implementation, the feedback time interval is a time interval preconfigured in the first terminal. That is, the first terminal may calculate the feedback resource based on the time interval preset in its own chip. Optionally, in the above wireless communication scenario, the time intervals preset in different wireless devices can be the same, so that the wireless communication device at the sending end is in the time slot for receiving the feedback information, and the wireless communication device at the receiving end also feeds back corresponding feedback information to the wireless communication device at the sending end in the same time slot.

In a possible implementation, the feedback time interval may be a time interval carried in a configuration instruction sent to the first terminal by a configuration device.

The configuration device may be a base station. That is, when two vehicular network communication devices in the V2x communication scenario performs data retransmission, the feedback time interval between the two vehicular network communication devices can be notified in advance by the base station through the configuration instruction.

Alternatively, the configuration device may also be any one of the first terminal and the second terminal. For example, the first terminal that receives the sidelink data can directly receive a configuration instruction sent by the second terminal that sends the sidelink data to obtain the feedback time interval. Alternatively, the second terminal can receive a configuration instruction sent by the first terminal to obtain the feedback time interval.

In step 504, the first terminal sends the feedback information for each retransmission to the second terminal on the feedback resource of the corresponding retransmission.

Optionally, in this step, when the retransmission process between the first terminal and the second terminal is partial of the at least two retransmissions performed for the sidelink data, the first terminal also sends the feedback information corresponding to the partial retransmissions to the second terminal on the corresponding feedback resource of the partial retransmissions.

Figure 8:
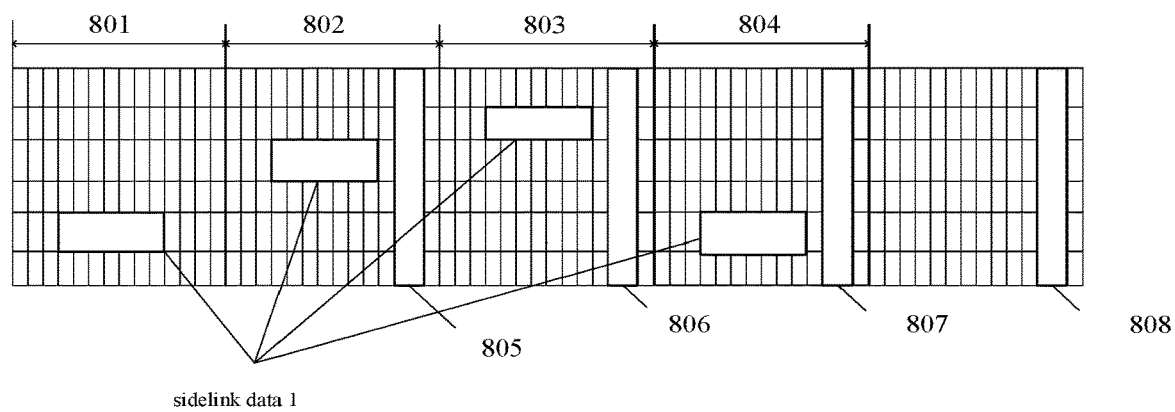
FIG. 8 is a schematic diagram of receiving and sending data by a first terminal in the retransmission process according to an embodiment of the disclosure.

In a possible implementation, for example, the feedback time interval obtained by the first terminal is one time slot. FIG. 8 illustrates a schematic diagram of receiving and sending data by the first terminal in the retransmission process according to an embodiment of the disclosure. As illustrated in FIG. 8, the second terminal sends the sidelink data 1 to the first terminal in four time slots, i.e., the first time slot 801, the second time slot 802, the third time slot 803, and the fourth time slot 804 respectively. When the first terminal feeds back the sidelink data 1 received each time, the first terminal can obtain a corresponding feedback resource according to the time slot in which the sidelink data 1 is received and the feedback time interval each time, i.e., the feedback resource 1 805, the feedback resource 2 806, the feedback resource 3 807, and the feedback resource 4 808 illustrated in F, and the feedback information is feedback to the second terminal on each feedback resource respectively.

Optionally, a symbol location where the first terminal gives feedback may also be preset. For example, as illustrated in FIG. 8, when the first terminal feeds back to the second terminal, the feedback information is sent on a penultimate symbol and an antepenult symbol in a time slot corresponding to each feedback resource. That is, when the first terminal obtains the time slot for sending the feedback information, it can send the feedback information to the second terminal at the corresponding symbol location in the corresponding time slot.

In step 505, in the retransmission process of the sidelink data with the first terminal, the second terminal obtains the feedback resource of each retransmission in the retransmission process.

For the acquisition of the feedback resource in this step, reference may be made to the description in step 503 above, which will not be repeated here.

In step 506, the second terminal receives the feedback information of each retransmission sent by the first terminal through a feedback resource of a corresponding retransmission.

Optionally, in this step, when the retransmission process between the first terminal and the second terminal is partial of the at least two retransmissions performed for the sidelink data, the second terminal also receives the feedback information corresponding to the partial retransmission from the first terminal on the corresponding feedback resource of the partial retransmissions.

In a possible implementation, when the second terminal receives the feedback information of the $k^{th}$ retransmission in the retransmission process, unfinished retransmission of the sidelink data is cancelled if the feedback information of the $k^{th}$ retransmission indicates that the sidelink data is correctly received. For example, the second terminal may perform 4 retransmissions of the sidelink data 1 to the first terminal. After receiving the feedback information for the second retransmission from the first terminal, the feedback information indicates that the first terminal has correctly received the sidelink data of current retransmission. At this time, if the second terminal has not completed the third retransmission and the fourth retransmission for the sidelink data 1, the second terminal can cancel the third retransmission and the fourth retransmission for the sidelink data 1. Further, the second terminal can also use the time domain resources of the third retransmission and the fourth retransmission for the sidelink data 1 to transmit sidelink data 2. That is, other data to be transmitted may be selected for transmission, so as to improve the utilization rate of the time domain resources. Optionally, the above k may be equal to the above i or j.

Optionally, the single wireless communication device (either the first terminal or the second terminal) may further send data to other wireless communication devices at the same time when receiving data. For example, when the second terminal sends the sidelink data 1 to the first terminal through two retransmissions, the second terminal may also receive the sidelink data 2 sent by the third device at the same time. The third device may be a wireless communication device that is different from the first terminal and the second terminal in the above wireless communication scenario. For example, the third device sends the sidelink data 2 to the second terminal through two retransmissions.

Figure 9:
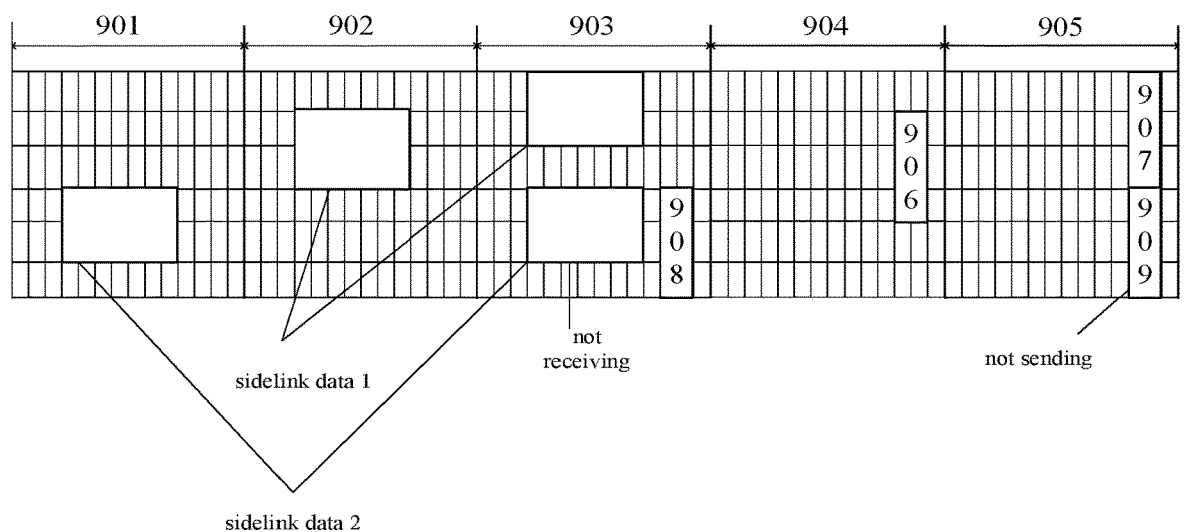
FIG. 9 is a schematic diagram of a time slot structure during multiple sidelink data transmissions according to an embodiment of the disclosure.

FIG. 9 illustrates a time slot structure during multiple sidelink data transmissions according to an embodiment of the disclosure. As illustrated in FIG. 9, the sidelink data 1 is sent by the second terminal to the first terminal in the second time slot 902 and the third time slot 903, the sidelink data 2 received by the second terminal from a third device is in the first time slot 901 and the third time slot 903. When the feedback time interval is one time slot, the second terminal, acting as a sending device of the sidelink data 1, receives the feedback information fed back by the first terminal in the fourth time slot 904 and the fifth time slot 905, i.e., the feedback information 906 and the feedback information 907 respectively. The second terminal, acting as a receiving device of the sidelink data 2, sends the feedback information corresponding to the sidelink data 2 to the third device in the third time slot 903 and the fifth time slot 905, i.e., the feedback information 908 and the feedback information 909 respectively. Optionally, when the second terminal is in a half-duplex working state, the second terminal can either receive the sidelink data 2 or send the sidelink data 1 in the third time slot 903. For example, a service priority of sending the sidelink data 1 is higher than a service priority of receiving the sidelink data 2, the second terminal can choose to send the sidelink data 1 in the third time slot 903 instead of receiving the sidelink data 2 sent by the third device. Correspondingly, the second terminal receives the feedback information fed back by the first terminal in the fifth time slot 905, but does not send feedback information to the third device in the fifth time slot 905.

Although the third device fails to receive the feedback information for the second retransmission of the sidelink data 2 from the second terminal on the feedback resource in the fifth time slot, the third device may determine whether the third device still needs to send the sidelink data 2 to the second terminal according to the feedback information of the second terminal for the first retransmission of the sidelink data 2 in the third time slot. Optionally, when the feedback information of the second terminal for the first retransmission of the sidelink data 2 in the third time slot indicates that the second terminal successfully receives the sidelink data 2, the third device does not need to send the sidelink data 2 to the second terminal. When the feedback information of the second terminal for the first retransmission of the sidelink data 2 in the third time slot indicates that the second terminal fails to successfully receive the sidelink data 2, the third device can reselect subsequent available transmission resources to send the sidelink data 2 to the second terminal.

In conclusion, with the solution of the disclosure, when the sidelink communication between terminals is performed, the first terminal feeds back for the sidelink data in each retransmission of the second terminal every time, which prevents the problem of conflicts between the feedback information and other information when the terminal performs data transmission with multiple other devices in the half-duplex state, and improves the success rate of feedback on the data retransmitted between the terminals.

The following are apparatus embodiments of the disclosure, which can be used to implement the method embodiments of the disclosure. For details that are not disclosed in the device embodiments of the disclosure, refer to the method embodiments of the disclosure.

Figure 10:
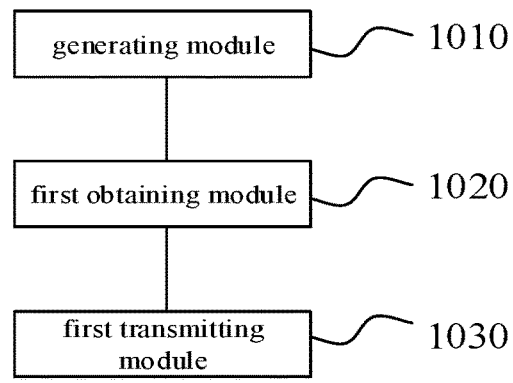
FIG. 10 is a block diagram of a retransmission feedback apparatus for sidelink communication according to an exemplary embodiment.

FIG. 10 is a block diagram of a retransmission feedback apparatus for sidelink communication according to another exemplary embodiment. The apparatus has the function of realizing the above method embodiment of the first terminal, and the function can be realized by hardware, or by executing corresponding software through hardware. The apparatus may be the base station described above, or may be set in the base station. Alternatively, the apparatus may be the terminal described above, or may be set in the terminal. The apparatus 1000 may include: a generating module 1010, a first obtaining module 1020, and a first transmitting module 1030.

The generating module 1010 is configured to generate feedback information for each retransmission during a retransmission process of sidelink data with a second terminal, the feedback information indicating whether the sidelink data is correctly received, the retransmission process including at least one retransmission.

The first obtaining module 1020 is configured to obtain a feedback resource of each retransmission in the retransmission process.

The first transmitting module 1030 is configured to transmit the feedback information of each retransmission to the second terminal through a feedback resource of the corresponding retransmission.

Optionally, the generating module 1010 is configured to: generate feedback information corresponding to an $i^{th}$ retransmission after performing the $i^{th}$ retransmission in the retransmission process, i being an integer greater than or equal to 1.

Optionally, the generating module 1010 is configured to: generate the feedback information corresponding to the $i^{th}$ retransmission based on a first transmission result at an end time point of the $i^{th}$ retransmission after performing the $i^{th}$ retransmission, the first transmission result indicating whether the sidelink data is correctly received during the $i^{th}$ retransmission.

Optionally, the generating module 1010 is configured to: generate the feedback information corresponding to the $i^{th}$ retransmission based on a second transmission result at an end time point of the $i^{th}$ retransmission after performing the $i^{th}$ retransmission, the second transmission result indicating whether the sidelink data is correctly received during previous i retransmissions in the retransmission process.

Optionally, the first obtaining module 1020 includes a first obtaining sub-module and a second obtaining sub-module.

The first obtaining sub-module is configured to obtain time-frequency information of a transmission resource used by a $j^{th}$ retransmission in the retransmission process, j being an integer greater than or equal to 1.

The second obtaining sub-module is configured to obtain a feedback resource of the $j^{th}$ retransmission based on the time-frequency information of the transmission resource used by the $j^{th}$ retransmission and a feedback time interval.

Optionally, the feedback time interval is a time interval preset in the first terminal; or, the feedback time interval is a time interval carried in a configuration instruction sent by a configuration device to the first terminal.

Optionally, the retransmission process is a retransmission process performed by the first terminal in a half-duplex operating state.

Optionally, the retransmission process is a partial of at least two retransmissions performed between the second terminal and the first terminal for the sidelink data.

Optionally, the retransmission process is a blind retransmission process.

Figure 11:
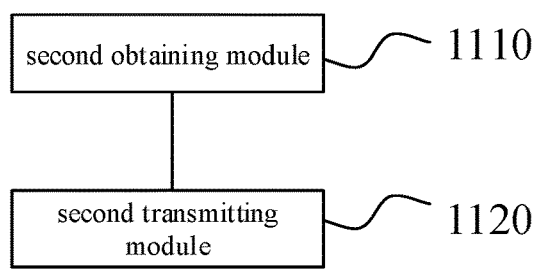
FIG. 11 is a block diagram of a retransmission feedback apparatus for sidelink communication according to an exemplary embodiment.

FIG. 11 is a block diagram of a retransmission feedback apparatus for sidelink communication according to an exemplary embodiment. The apparatus has the function of realizing the above method embodiment of the second terminal, and the function can be realized by hardware, or by executing corresponding software through hardware. The apparatus may be the base station described above, or it may be set in the base station. Alternatively, it may be the terminal described above, or set in the terminal. The apparatus 1100 may include: a second obtaining module 1110 and a second transmitting module 1120.

The second obtaining module 1110 is configured to obtain a feedback resource of each retransmission during a retransmission process of sidelink data with a first terminal, the retransmission process including at least one retransmission.

The second transmitting module 1120 is configured to receive feedback information of each retransmission sent by the first terminal through a feedback resource of a corresponding retransmission, the feedback information indicating whether the sidelink data is correctly received.

Optionally, the second obtaining module 1110 includes a third obtaining sub-module and a fourth obtaining sub-module.

The third obtaining sub-module is configured to obtain time-frequency information of a transmission resource used by a $j^{th}$ retransmission in the retransmission process, j being an integer greater than or equal to 1.

The fourth obtaining sub-module is configured to obtain a feedback resource of the $j^{th}$ retransmission based on the time-frequency information of the transmission resource used by the $j^{th}$ retransmission and a feedback time interval.

Optionally, the feedback time interval is a time interval preset in the second terminal; or, the feedback time interval is a time interval carried in a configuration instruction sent by a configuration device to the second terminal.

Optionally, the apparatus further includes: a canceling module, configured to cancel unfinished retransmission of the sidelink data when feedback information of the $k^{th}$ retransmission in the retransmission process is received and the feedback information of the $k^{th}$ retransmission indicates that the sidelink data is correctly received.

Optionally, the retransmission process is a retransmission process performed by the second terminal in a half-duplex operating state.

Optionally, the retransmission is a partial of at least two retransmissions performed between the second terminal and the first terminal for the sidelink data.

Optionally, the retransmission process is a blind retransmission process.

It should be noted that, when the apparatus in the above embodiments realizes its functions, only the division of the above functional modules is used as an example for illustration. In actual applications, the above functions can be allocated to different functional modules according to actual needs. That is, the content structure of the apparatus is divided into different functional modules to complete all or part of the functions described above.

Regarding the apparatus in the embodiments, the specific manner in which each module performs operation has been described in detail in the embodiments of the method, and detailed description will not be given here.

An exemplary embodiment of the disclosure also provides a retransmission feedback device, which can implement the retransmission feedback method at the first terminal provided in the disclosure. The device may be the base station described above, or it may be set in the base station. Alternatively, it may be the terminal described above, or may be set in the terminal. The device includes a processor and a memory for storing instructions executable by the processor. The processor is configured to: generate feedback information for each retransmission during a retransmission process of sidelink data with a second terminal, the feedback information indicating whether the sidelink data is correctly received, the retransmission process including at least one retransmission; obtain a feedback resource of each retransmission in the retransmission process; and transmit the feedback information of each retransmission to the second terminal through a feedback resource of the corresponding retransmission.

Optionally, when generating feedback information for each retransmission during a retransmission process of sidelink data with a second terminal, the processor is configured to: generate feedback information corresponding to an $i^{th}$ retransmission after performing the $i^{th}$ retransmission in the retransmission process, i being an integer greater than or equal to 1.

Optionally, when generating the feedback information corresponding to the $i^{th}$ retransmission after performing the $i^{th}$ retransmission in the retransmission process, the processor is configured to: generate the feedback information corresponding to the $i^{th}$ retransmission based on a first transmission result at an end time point of the $i^{th}$ retransmission after performing the $i^{th}$ retransmission, the first transmission result indicating whether the sidelink data is correctly received during the $i^{th}$ retransmission.

Optionally, when generating the feedback information corresponding to the $i^{th}$ retransmission after performing the $i^{th}$ retransmission in the retransmission process, the processor is configured to: generate the feedback information corresponding to the $i^{th}$ retransmission based on a second transmission result at an end time point of the $i^{th}$ retransmission after performing the $i^{th}$ retransmission, the second transmission result indicating whether the sidelink data is correctly received during previous i retransmissions in the retransmission process.

Optionally, obtaining the feedback resource of each retransmission in the retransmission process includes: obtaining time-frequency information of a transmission resource used by a $j^{th}$ retransmission in the retransmission process, j being an integer greater than or equal to 1; and obtaining a feedback resource of the $j^{th}$ retransmission based on the time-frequency information of the transmission resource used by the $j^{th}$ retransmission and a feedback time interval.

Optionally, the feedback time interval is a time interval preset in the first terminal; or, the feedback time interval is a time interval carried in a configuration instruction sent by a configuration device to the first terminal.

Optionally, the retransmission process is a retransmission process performed by the first terminal in a half-duplex operating state.

Optionally, the retransmission process is a partial of at least two retransmissions performed between the second terminal and the first terminal for the sidelink data.

Optionally, the retransmission process is a blind retransmission process.

An exemplary embodiment of the disclosure also provides a retransmission feedback apparatus, which can implement the retransmission feedback method at the base station side provided in the disclosure. The device may be the base station described above, or it may be set in the base station. Alternatively, it may be the terminal described above, or may be set in the terminal. The device includes a processor and a memory for storing instructions executable by the processor. The processor is configured to: obtain a feedback resource of each retransmission during a retransmission process of sidelink data with a first terminal, the retransmission process including at least one retransmission; and receive feedback information of each retransmission sent by the first terminal through a feedback resource of a corresponding retransmission, the feedback information indicating whether the sidelink data is correctly received.

Optionally, when obtaining the feedback resource of each retransmission during the retransmission process of the sidelink data with the first terminal, the processor is configured to: obtain time-frequency information of a transmission resource used by a $j^{th}$ retransmission in the retransmission process, j being an integer greater than or equal to 1; and obtain a feedback resource of the $j^{th}$ retransmission based on the time-frequency information of the transmission resource used by the $j^{th}$ retransmission and a feedback time interval.

Optionally, the feedback time interval is a time interval preset in the second terminal; or, the feedback time interval is a time interval carried in a configuration instruction sent by a configuration device to the second terminal.

Optionally, the processor is configured to: cancel unfinished retransmission of the sidelink data when feedback information of the $k^{th}$ retransmission in the retransmission process is received and the feedback information of the $k^{th}$ retransmission indicates that the sidelink data is correctly received.

Optionally, the retransmission process is a retransmission process performed by the second terminal in a half-duplex operating state.

Optionally, the retransmission is a partial of at least two retransmissions performed between the second terminal and the first terminal for the sidelink data.

Optionally, the retransmission process is a blind retransmission process.

The disclosure mainly introduces the solution of the embodiments of the disclosure from the perspective of interaction between the first terminal and the second terminal. It is understood that, in order to implement the above functions, the first terminal and the second terminal include hardware structures and/or software modules corresponding to respective functions. In combination with the units and algorithm steps of the examples described in the embodiments of the disclosure, the embodiments of the disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solution of the embodiments of the disclosure.

Figure 12:
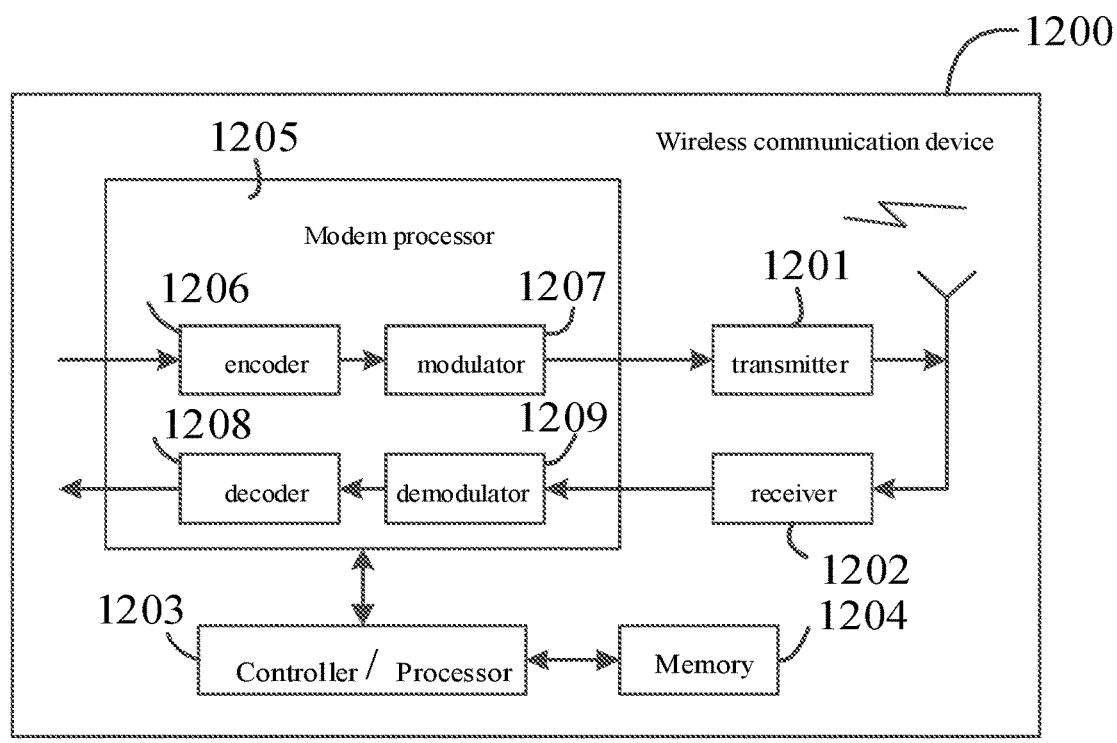
FIG. 12 is a schematic diagram of a wireless communication device according to an exemplary embodiment.

FIG. 12 is a schematic diagram of a wireless communication device according to an exemplary embodiment. The wireless communication device 1200 includes a transmitter 1201, a receiver 1202 and a processor 1203. The processor 1203 may be a controller, which is represented as "controller/processor 1203" in FIG. 12. Optionally, the wireless communication device 1200 may further include a modem processor 1205, the modem processor 1205 may include an encoder 1206, a modulator 1207, a decoder 1208, and a demodulator 1209.

In an example, the transmitter 1201 adjusts (for example, performs analog conversion, filtering, amplification, and up-conversion) the output samples and generates an uplink signal. The uplink signal is transmitted to the base station described in the above embodiment via an antenna. On the downlink, the antenna receives the downlink signal transmitted by the base station in the above embodiments. The receiver 1202 adjusts (e.g., filters, amplifies, down-converts, and digitizes) the signal received from the antenna and provides input samples. In the modem processor 1205, the encoder 1206 receives the service data and signaling messages to be transmitted on the uplink, and processes (e.g., formats, encodes and interleaves) the service data and signaling messages. The modulator 1207 further processes (for example, through symbol mapping and modulating) the encoded service data and signaling messages and provides output samples. The demodulator 1209 processes (e.g., demodulates) the input samples and provides symbol estimations. The decoder 1208 processes (e.g., de-interleaves and decodes) the symbol estimations and provides decoded data and signaling messages sent to the wireless communication device 1200. The encoder 1206, the modulator 1207, the demodulator 1209 and the decoder 1208 can be implemented by a synthesized modem processor 1205. These units are processed according to the radio access technology (for example, the access technology of LTE and other evolving systems) adopted by the radio access network. It should be noted that, when the wireless communication device 1200 does not include the modem processor 1205, the above functions of the modem processor 1205 may also be performed by the processor 1203.

The processor 1203 controls and manages the actions of the wireless communication device 1200, and is used to execute the processing procedure performed by the wireless communication device 1200 in the above embodiments of the disclosure. For example, the processor 1203 is further configured to execute the respective steps at the wireless communication device side in the method embodiments, and/or other steps of the technical solution described in the embodiments of the disclosure.

Further, the wireless communication device 1200 may further include a memory 1204, and the memory 1204 is configured to store program codes and data for the wireless communication device 1200.

It is understood that FIG. 12 only shows a simplified design of the wireless communication device 1200. In practical applications, the wireless communication device 1200 may include any number of transmitters, receivers, processors, modem processors and memories, and all the wireless communication devices that can implement the embodiments of the disclosure are within the protection scope of embodiments of the disclosure.

The embodiments of the disclosure also provide a computer-readable storage medium on which a computer program is stored, and when the computer program is executed by a processor of a first terminal, the retransmission feedback method for sidelink communication at the first terminal is implemented.

The embodiments of the disclosure also provide a computer-readable storage medium on which a computer program is stored, and when the computer program is executed by a processor of a second terminal, the retransmission feedback method for sidelink communication at the second terminal is implemented.

It should be understood that the "plurality" mentioned herein refers to two or more. "And/or" describes the association relationship of the associated objects, indicating that there can be three types of relationships, for example, A and/or B, which can mean: A alone exists, A and B exist at the same time, and B exists alone. The character "/" generally indicates that the associated objects before and after are in an "or" relationship.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A retransmission feedback method for sidelink communication, executed by a first terminal, the method comprising:
    for some retransmissions partly selected by the first terminal from at least two retransmissions performed with the second terminal for sidelink data, generating feedback information corresponding to an $i^{th}$ selected retransmission based on a transmission result at an end time point of the $i^{th}$ selected retransmission, i being an integer greater than or equal to 1 and less than or equal to a number of selected retransmissions, the transmission result indicating whether sidelink data is correctly received during previous i selected retransmissions, the feedback information indicating whether the sidelink data is correctly received, the selected retransmissions are selected by the first terminal based on an indication signaling from the second terminal, wherein the indication signaling indicates which retransmissions are selected from the at least two retransmissions, and no feedback information is generated by the first terminal for those retransmissions not selected;
    obtaining time-frequency information of a transmission resource used by the $i^{th}$ selected retransmission;
    obtaining a feedback resource of the $i^{th}$ selected retransmission based on the time-frequency information of the transmission resource used by the $i^{th}$ selected retransmission and a feedback time interval and determining a symbol position of a time slot corresponding to the feedback resource, wherein the feedback time interval is a time interval preset in the first terminal, or a time interval carried in a configuration instruction sent by a configuration device to the first terminal; and
    transmitting the feedback information of each selected retransmission to the second terminal on the determined symbol position of the feedback resource of the corresponding selected retransmission.

2. The method of claim 1, wherein the at least two retransmissions are performed by the first terminal in a half-duplex operating state.

3. The method of claim 1, wherein the at least two retransmissions are performed in a blind retransmission process.

4. A retransmission feedback method for sidelink communication, executed by a second terminal, comprising:
    for some retransmissions partly selected by a first terminal from at least two retransmissions performed with the second terminal for sidelink data, obtaining time-frequency information of a transmission resource used by an $i^{th}$ selected retransmission, i being an integer greater than or equal to 1 and less than or equal to a number of selected retransmissions, the selected retransmissions are selected by the first terminal based on an indication signaling from the second terminal, wherein the indication signaling indicates which retransmissions are selected from the at least two retransmissions, and no feedback information is generated by the first terminal for those retransmissions not selected;
    obtaining a feedback resource of the $i^{th}$ selected retransmission based on the time-frequency information of the transmission resource used by the $i^{th}$ selected retransmission and a feedback time interval and determining a symbol position of a time slot corresponding to the feedback resource, wherein the feedback time interval is a time interval preset in the second terminal, or a time interval carried in a configuration instruction sent by a configuration device to the second terminal; and
    receiving feedback information of each selected retransmission sent by the first terminal on the preset symbol position of the feedback resource of a corresponding selected retransmission, the feedback information indicating whether the sidelink data is correctly received;
    wherein feedback information corresponding to the $i^{th}$ selected retransmission is generated based on a transmission result at an end time point of the $i^{th}$ selected retransmission, the transmission result indicating whether the sidelink data is correctly received by the first terminal during previous i selected retransmissions.

5. The method of claim 4, comprising:
    canceling unfinished retransmission of the sidelink data when feedback information of the $i^{th}$ selected retransmission is received and the feedback information of the $i^{th}$ selected retransmission indicates that the sidelink data is correctly received.

6. The method of claim 4, wherein the at least two retransmissions are performed by the second terminal in a half-duplex operating state.

7. The method of claim 4, wherein the at least two retransmissions are performed in a blind retransmission process.

8. A retransmission feedback apparatus for sidelink communication, applied to a first terminal, comprising:
    a processor;
    a memory for storing instructions executable by the processor; wherein,
    the processor is configured to implement the retransmission feedback method for sidelink communication according to claim 1.

9. A retransmission feedback apparatus for sidelink communication, applied to a second terminal, comprising:
    a processor;
    a memory for storing instructions executable by the processor; wherein,
    the processor is configured to implement the retransmission feedback method for sidelink communication according to claim 4.

10. A non-transitory computer-readable storage medium, wherein the computer-readable storage medium contains executable instructions, and a processor in a first terminal calls the executable instructions to implement the retransmission feedback method for sidelink communication according to claim 1.

11. A non-transitory computer-readable storage medium, wherein the computer-readable storage medium contains executable instructions, and a processor in a second terminal calls the executable instructions to implement the retransmission feedback method for sidelink communication according to claim 4.

\* \* \* \* \*